US012559196B2

(12) United States Patent  
Jaillet et al.

(10) Patent No.: US 12,559,196 B2  
(45) Date of Patent: Feb. 24, 2026

(54) SYSTEM FOR ADAPTING THE CONTROL OF AN ELECTRIC BICYCLE MOTOR TO THE RESISTANCE TO FORWARD TRAVEL

(71) Applicant: eBikeLabs, Grenoble (FR)

(72) Inventors: Léonard Jaillet, Grenoble (FR); Rémi Bouju, Saint Egrève (FR)

(73) Assignee: eBikeLabs, Grenoble (FR)

( * ) Notice: Subject to any disclaimer, the term of this patent is extended or adjusted under 35 U.S.C. 154(b) by 60 days.

(21) Appl. No.: 18/728,405

(22) PCT Filed: Dec. 21, 2022

(86) PCT No.: PCT/FR2022/052463  
§ 371 (c)(1),  
(2) Date: Jul. 11, 2024

(87) PCT Pub. No.: WO2023/135373  
PCT Pub. Date: Jul. 20, 2023

(65) Prior Publication Data  
US 2025/0058850 A1 Feb. 20, 2025

(30) Foreign Application Priority Data  
Jan. 12, 2022 (FR) ...................................... 2200216

(51) Int. Cl.  
B62M 6/50 (2010.01)  
B62J 45/411 (2020.01)

(52) U.S. Cl.  
CPC .............. B62M 6/50 (2013.01); *B62J 45/411* (2020.02)

(58) Field of Classification Search  
CPC ................................. B62M 6/50; B62J 45/411  
See application file for complete search history.

(56) References Cited

U.S. PATENT DOCUMENTS

| | | | |
|---|---|---|---|
| 10,754,340 B1 * | 8/2020 | Corbett | B62M 6/50 |
| 10,850,801 B2 * | 12/2020 | Wiegel | B60L 15/2009 |

(Continued)

FOREIGN PATENT DOCUMENTS

| | | |
|---|---|---|
| DE | 102019106585 A1 | 9/2019 |
| JP | 2002-255082 A | 9/2002 |

OTHER PUBLICATIONS

International Search Report and Written Opinion of the International Searching Authority dated Mar. 29, 2023, in connection with International Application No. PCT/FR2022/052463, 11 pages.

*Primary Examiner* — Richard M Camby

(57) ABSTRACT

The present disclosure relates to a method for controlling an electric motor of a pedal-operated vehicle, comprising the steps of measuring a pedal torque applied to a crankset of the vehicle; applying to the electric motor a control proportional to the product of the torque and a variable assistance level; determining a parameter indicative of a deviation of vehicle drag forces from nominal conditions, as a linear combination of a measurement of a motor torque, indicative of an instantaneous force supplied by the motor, the measured pedal torque, indicative of an instantaneous force resulting from pedaling, and a nominal drag force, function of speed and constant friction coefficients determinable for nominal riding conditions; and continuously modulating the assistance level as a function of the parameter indicative of the drag deviation.

5 Claims, 2 Drawing Sheets

(56)        References Cited

U.S. PATENT DOCUMENTS

| 10,882,507 | B2 * | 1/2021 | Ohn | B60L 15/20 |
|---|---|---|---|---|
| 2005/0277501 | A1 * | 12/2005 | Kuras | B60K 6/543 |
| | | | | 474/18 |
| 2019/0291812 | A1 | 9/2019 | Tsuchizawa et al. | |
| 2021/0197925 | A1 | 7/2021 | Shahana | |

* cited by examiner

SYSTEM FOR ADAPTING THE CONTROL OF AN ELECTRIC BICYCLE MOTOR TO THE RESISTANCE TO FORWARD TRAVEL

CROSS-REFERENCE TO RELATED APPLICATIONS

This application is a 371 National Stage of International Application No. PCT/FR2022/052463, filed Dec. 21, 2022, which claims priority to French Patent Application No. 2200216, filed Jan. 12, 2022, the disclosures of which are herein incorporated by reference in their entirety.

TECHNICAL FIELD

The present disclosure relates to improving the riding comfort of an electrically assisted bicycle.

BACKGROUND

When electric bicycles are fitted with a torque sensor, a conventional control loop is configured to provide the motor with a torque (or current) control proportional to the effort provided by the rider. The proportionality coefficient may often be selected by the rider between several pre-programmed levels, often referred to as "assistance levels".

For a given assistance level, however, the users adapt their effort to changing riding conditions (variations in slope, wind, terrain). For example, when tackling a slope, the pedaling effort is increased to keep the same pace. If the effort becomes too great, the user may select a higher assistance level or a lower gear ratio, or both.

To prevent the user from having to change the assistance level frequently in difficult conditions, for example on a technical mountain bike climb, Bosch® control systems offer a so-called "eMTB" mode. In this mode, the control system automatically selects a suitable assistance level from the pre-programmed levels according to the torque measured at the pedals-when the pedal torque increases significantly, the controller automatically selects a higher assistance level, and vice versa.

FIG. 1 is a block diagram of a conventional field-oriented control circuit, which may be used to control a bicycle motor with several assistance levels. The motor is, for example, of the brushless DC type, comprising a magnetized rotor and a stator with three windings or phases.

The field-oriented control circuit, also known as a vector control circuit, receives a setpoint vector with a field component Ids* and a torque component Iqs*. This setpoint vector is subtracted in 12 from a feedback vector (Ids, Iqs) determined from the currents Ia, Ib, Ic measured in the three phases of motor 10 and the motor speed ωr. Each of the components of the resulting difference vector is processed by a respective PID filter to produce a rotor vector of voltage components Vds, Vqs. The rotor vector undergoes an inverse Park transform in 14 to produce a stator vector of voltage components Vα and Vβ. The inverse Park transform uses the rotational speed ωr. The stator vector is used to control a pulse-width modulator 16. The modulator 16 produces three signals Va, Vb, Vc, which are used to control each of the motor's three phases via a power switching stage 18.

A feedback loop includes sensors 20 that measure the currents Ia, Ib, Ic in the three phases, and the motor speed ωr. The currents Ia, Ib, Ic undergo a Clarke transform 22 to produce a measured stator vector of current components Iα and Iβ. A Park transform 24 receives the measured stator vector and the measured rotational speed ωr to produce a measured rotor vector of current components Ids and Iqs, components which are subtracted from the setpoint in 12.

To influence the assistance level, the torque setpoint Iqs* in 26 is multiplied by a modulation coefficient γ, which is typically selected from discrete values, often ranging from 1 to 3.

SUMMARY

In general, a method is provided for controlling an electric motor of a pedal-operated vehicle, comprising the steps of measuring a pedal torque applied to a crankset of the vehicle; applying to the electric motor a control proportional to the product of the torque and a variable assistance level indicative of a deviation of vehicle drag forces from nominal conditions, as a linear combination of a measurement of a motor torque, indicative of an instantaneous force supplied by the motor, the measured pedal torque, indicative of an instantaneous force resulting from pedaling, and a nominal drag force, function of speed and constant friction coefficients determinable for nominal riding conditions; and continuously modulating the assistance level as a function of the parameter indicative of the drag deviation.

The linear combination may also involve a differentiation of instantaneous speed measurements, indicative of a vehicle acceleration.

The parameter indicative of the drag deviation may be the sum of the instantaneous force supplied by the motor and the instantaneous force resulting from pedaling, from which is subtracted the nominal drag force and a force of inertia equal to the product of the acceleration and an average mass of the vehicle with its load.

The assistance level may increase proportionally to the parameter indicative of the drag deviation between two thresholds of the parameter.

The parameter indicative of the drag deviation may be subjected to smoothing.

BRIEF DESCRIPTION OF DRAWINGS

The following non-limiting description is provided in relation to the attached figures, among which.

DETAILED DESCRIPTION

Conventional motor control systems, such as implementing the aforementioned "eMTB" mode, automatically adapt the assistance level according to variations in the pedal torque measured in the crankset. Any variation in torque is not necessarily indicative of a persistent change in drag forces, which may cause riding discomfort in conditions that do not require significant changes in the assistance level, such as urban conditions. For example, a change in pedal torque may be due to an urge to modify the pedaling cadence while riding on a horizontal surface, in which case there is no desire to experience an abrupt change in assistance. On the other hand, the user may wish the assistance level to increase when tackling a hill, and the increase to be progressive with the gradient.

To increase the riding comfort in conditions that do not require stepwise increments in the assistance power, such as in urban conditions, the present disclosure proposes an automatic and continuous modification of the assistance level as a function of a parameter representing effective variations in drag forces.

Figure 2:
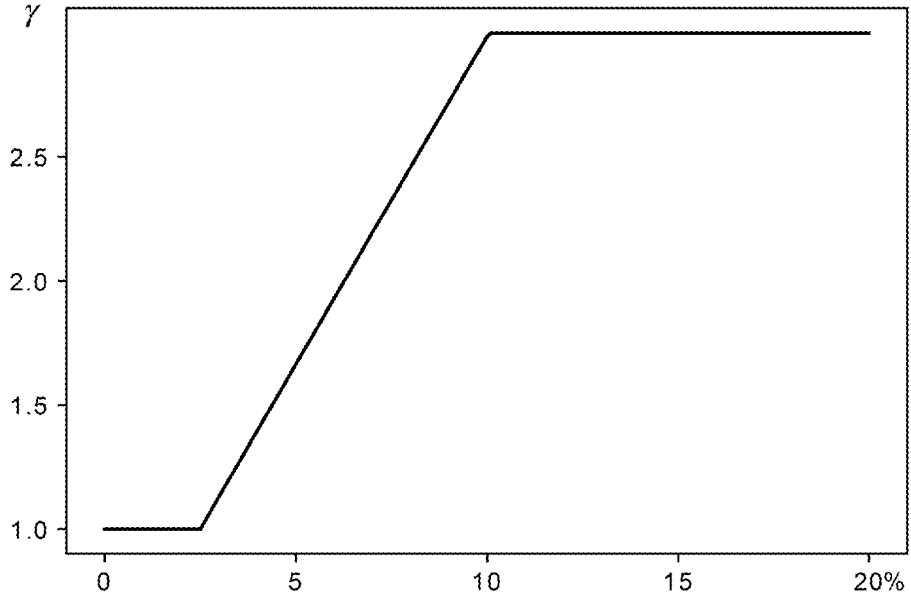
FIG. 2 illustrates an example of a curve showing a continuous variation in the assistance level as a function of drag.

FIG. 2 shows a curve illustrating an exemplary variation of an assistance level modulation coefficient $\gamma$ following this objective, as a function of a parameter representing drag forces, such as a slope gradient, expressed in percent. Up to 2.5% gradient, the assistance level remains constant and equal to its nominal value, in this case 1. From 2.5% onwards, the modulation coefficient increases linearly with the gradient to saturate at 3 when the gradient reaches 10%.

A gradient has been provided as an example, but the aim is to use a more general parameter indicative of any cause of drag, such as gradient, headwind, or rolling resistance, using information available on a conventional electrically-assisted bicycle.

The dynamics of an electric bicycle may be written as follows:

$$Mt \cdot Av = Fm + Fc - Fr \quad (1)$$

Where:
Av is the acceleration,
Mt is the moving mass (bike, rider and load),
Fm is the motor drive force,
Fc is the force exerted by the cyclist, and
Fr represents the drag forces.

The aim is therefore to estimate the forces Fr to act upon the assistance level. It turns out that a satisfactory estimation of this parameter is possible with constant empirical data and variable information provided by the sensors of an existing bicycle.

Hereinafter, $Fr_{ref}$ denotes the nominal drag forces when riding on a standard asphalt road with zero gradient and no wind. Additional (potentially negative) drag forces representing the deviation of the effective drag forces from the nominal conditions, such as the variation in friction with the road, slope and wind, are denoted by $\Delta Fr$. This yields:

$$Fr = Fr_{ref} + \Delta Fr \quad (2)$$

In addition:
$\Delta Fr = Ff + Fp + Fv$, with:
Ff: the additional force due to effective friction between the wheels and the road.
Fp: the additional force due to effective road gradient.
Fv: the additional force due to effective wind.
And:

$$Fr_{ref} = K0 + K1 \cdot v + K2 \cdot v^2 \quad (3)$$

With:
v: bike speed.
K0: static friction forces on a horizontal surface.
K1·v: viscous friction forces.

$K2 \cdot v^2$: aerodynamic friction forces.
K0 to K2 are empirically determinable constants.
Combining (1) and (2) yields:

$$\Delta Fr = Fm + Fc - Mt \cdot Av - Fr_{ref} \quad (4)$$

Figure 1:
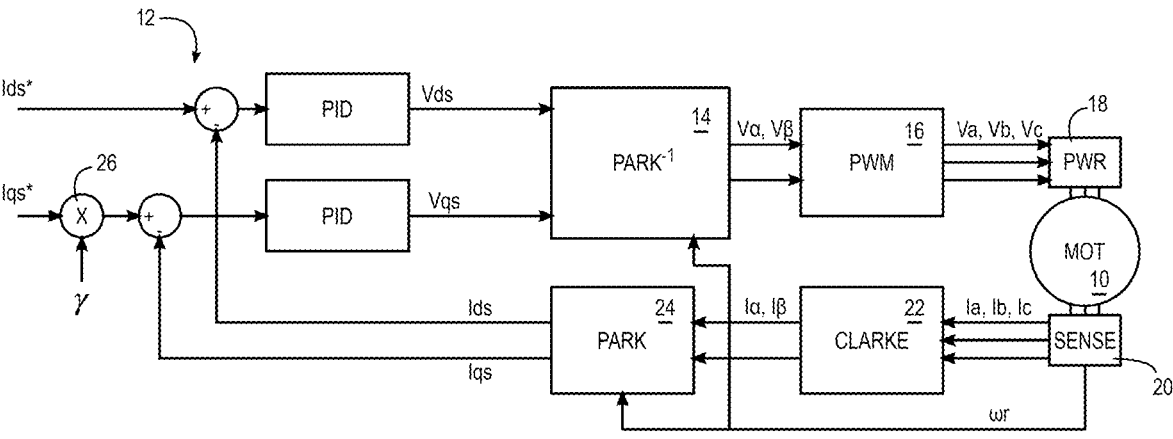
FIG. 1, previously described, shows a block diagram of a conventional field-oriented control system used for electric bicycle motors, to which the present disclosure is applicable.

The parameter of interest $\Delta Fr$, indicative of the effective drag, more precisely the deviation of the drag from the given nominal conditions, is evaluated thanks to the right-hand terms in equation (4), all of which may be determined with satisfactory accuracy with the means available on a conventional electric bicycle. In particular:

The motor drive force Fm may be determined from the value Iqs returned by the feedback loop of the control system shown in FIG. 1. This value Iqs, derived from motor current measurements, is directly indicative of the instantaneous torque supplied by the motor. This torque translates into a drive force exerted by the drive wheel as a function of its diameter, which is the force Fm contributed by the motor.

The cyclist force Fc may be determined from the torque information provided by the pedal-mounted torque sensor. This torque translates into a gear-dependent drive force exerted by the drive wheel, which is the force Fc contributed by the cyclist.

The torque setpoint Iqs* supplied to the control system of FIG. 1 is generally also indicative of the pedal torque.

The moving mass Mt may be approximated by the sum of the mass of the bike and the average mass of an individual plus load.

The acceleration Av may be determined by differentiating speed measurement samples. An electric bicycle may have various speed sensors, in particular on a wheel to indicate the speed to the rider, and in any case on the motor to contribute to the control loop, such as the value $\omega r$ in FIG. 1.

The $Fr_{ref}$ parameter may be determined from equation (3), while parameters K0, K1 and K2 correspond to constant coefficients known from the literature or that can be determined empirically to suit the application.

From relationship (4), one may intuitively understand how the system works. For example, as soon as the cyclist tackles a slope, the effort Fc remains substantially constant at the beginning, and so does the motor force Fm linked to the torque supplied by the cyclist. This leads to a noticeable deceleration, and thus to the appearance of a negative Mt. Av inertia term (or positive $-Mt \cdot Av$ term). The $-Fr_{ref}$ term increases somewhat as speed decreases. Thus, the parameter $\Delta Fr$ increases and calls for an increase in the assistance level. Once the cyclist has returned to a cruising speed, the inertia term cancels out, and the $Fr_{ref}$ term remains constant. However, to compensate for the slope, the forces Fm and Fc are higher than before, resulting in a $\Delta Fr$ value that induces a sustained increase in the assistance level—the cyclist then provides less effort in relation to the motor force Fm produced than before tackling the slope.

The operation is similar when the cyclist is riding on a horizontal surface and a headwind comes up, or when tackling terrain with more friction on the wheels.

The system operates symmetrically in the event of a decrease in pedaling effort. For example, when the cyclist tackles a downhill slope, the bike accelerates and the pedaling effort decreases, causing a negative value for the parameter $\Delta Fr$, and a corresponding decrease in the assistance level.

In another case, the cyclist riding horizontally decides to go faster. The cyclist presses harder on the pedals, causing the forces Fm and Fc to increase. The resulting acceleration Av increases, and the negative inertia term-Mt·Av is antagonistic. The negative term $-Fr_{ref}$, increasing in absolute value with speed, is also antagonistic. Thus, the parameter ΔFr tends to remain stable, calling for no change in the assistance level. Indeed, even if the user accelerates, requiring more effort to overcome friction, the riding conditions are still considered nominal.

The inertia term Mt·Av provides a coherent system response by acting during transient phases, in particular by producing a rapid increase in the assistance level as soon as a deceleration occurs due to an increase in drag and, conversely, by moderating the variation in the assistance level during phases of voluntary acceleration (or deceleration) under constant terrain conditions.

Alternatively, a less sophisticated system may omit the inertia term Mt·Av in the expression of the parameter ΔFr. Such a system will produce satisfactory results during constant-speed phases, but operation will be less consistent during transient phases, which may affect riding comfort.

Filtering may be applied to the parameter ΔFr to improve reliability, smoothing out noise and removing outliers that may be produced in the calculation of the acceleration Av by derivation. Filtering may involve the following steps with numerical values applicable to the bicycle domain:

Capping ΔFr to the interval [−300 N, 300 N], i.e.: ΔFr=min(300, max(−300, ΔFr)).

At a sampling rate of 100 Hz, applying an exponential smoothing, which for a sample at t results in: $\Delta Fr = \alpha \Delta Fr_{t-1} + (1-\alpha)\Delta Fn_t$, with α between 0 and 1, preferably close to 1 (e.g. 0.99).

In a practical application, to obtain a response of the type shown in FIG. 2, the following relationship may be used for the modulation coefficient:

$$\gamma = \gamma_{min} + (\gamma_{max} - \gamma_{min}) \cdot (\Delta Fr - \Delta Fr_{min})/(\Delta Fr_{max} - \Delta Fr_{min})$$

With:

$\gamma_{min}$: minimum modulation coefficient used (e.g. $\gamma_{min}$=1 in a typical case)

$\gamma_{max}$: maximum modulation coefficient used (e.g. $\gamma_{max}$=3)

$\Delta Fr_{min}$: minimum force from which to modulate the assistance level (e.g. $\Delta Fr_{min}$=25 N)

$\Delta Fr_{max}$: maximum force up to which to modulate the assistance level (e.g. $\Delta Fr_{max}$=100 N)

Finally, γ is constrained to the interval [$\gamma_{max}$, $\gamma_{min}$].

Figure 3A:
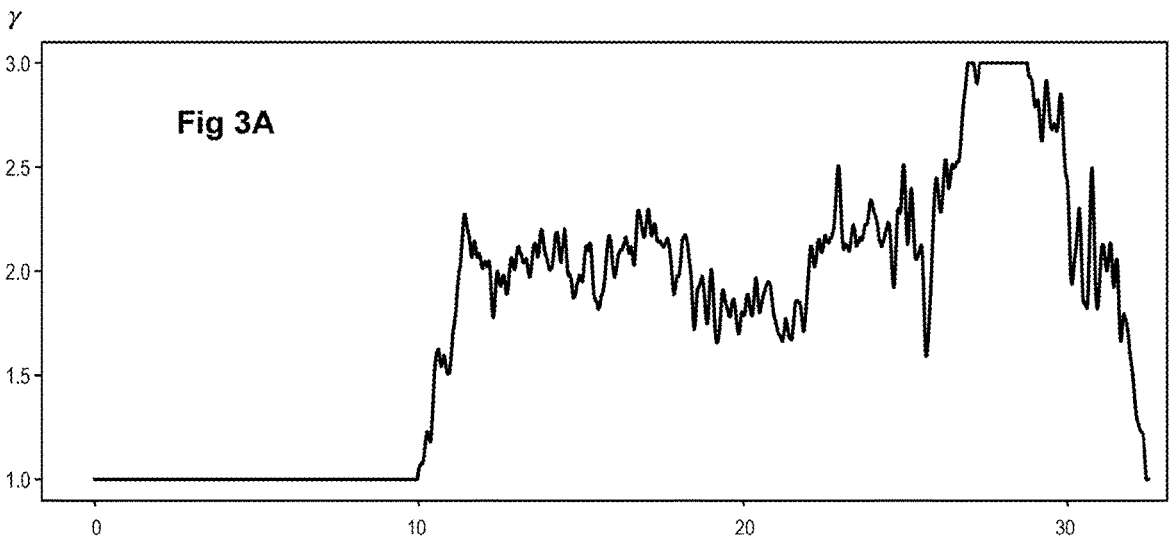
FIGS. 3A, 3B and 3C are curves illustrating, in a real use example, the changes, respectively, in the assistance level, motor current and pedal torque exerted by a cyclist tackling a slope.
Figure 3B:
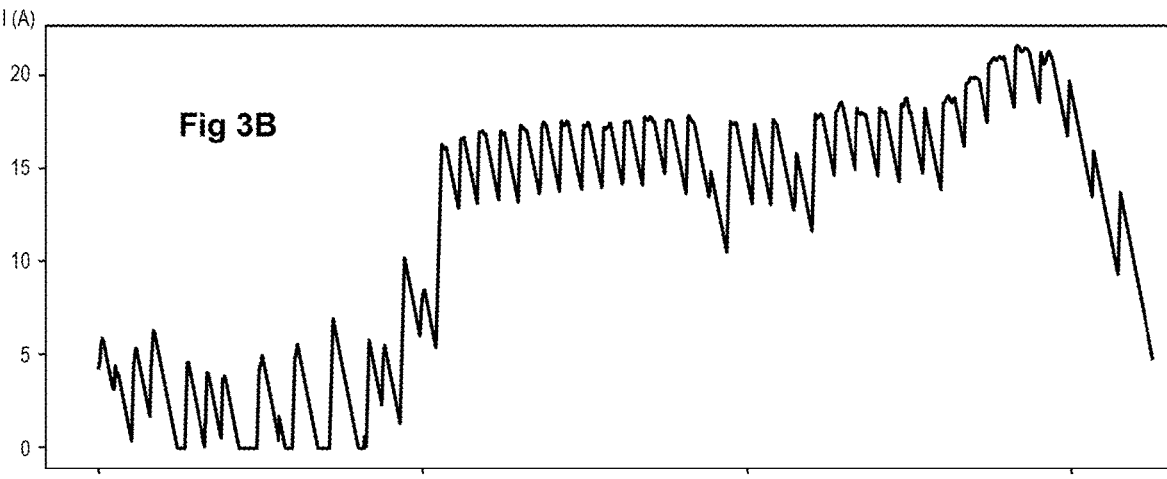
Figure 3C:
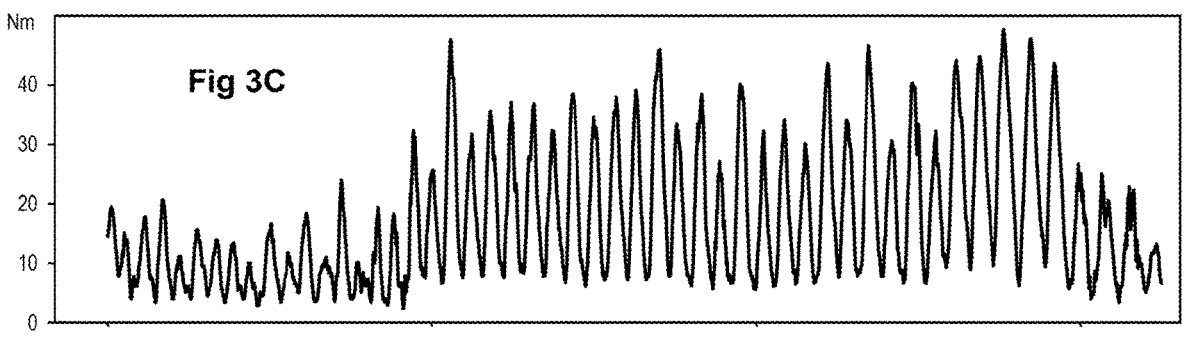

FIGS. 3A to 3C show curves illustrating instantaneous signals measured in an effective exemplary use of the system. The x-axis represents time in seconds.

At 10 seconds, the cyclist starts to climb after riding on a horizontal surface. The gradient remains more or less constant until 25 seconds, when it steepens to around 30 seconds. Then the gradient returns to zero.

FIG. 3A illustrates the corresponding variation in the modulation coefficient γ. It remains constant and equal to 1 until 10 seconds. Then it rises rapidly to 2 and oscillates around 2. At around 25 seconds, the coefficient γ rises rapidly to 3 and remains saturated at 3 for a few seconds. After 30 seconds, the coefficient falls back to 1.

FIG. 3B shows the corresponding variation of the motor current I in amperes, directly translating motor torque. The motor current follows the general pattern of the modulation coefficient γ, with marked, regular oscillations.

Between 0 and 10 seconds, the current oscillates around an average value of approx. 2.5 A. After 10 seconds, the current starts to oscillate around an average value of approx. 15 A.

Between 25 and 30 seconds, the current increases less significantly than the modulation coefficient γ, and oscillates around an average value of around 20 A. The motor current also depends on the pedaling effort-if it doesn't follow the coefficient γ exactly, it is because the pedaling conditions are different, or because it is limited by the control system for safety reasons.

FIG. 3C shows the variation of the torque measured at the pedals in Nm. The torque oscillates around an average value at the pedaling frequency. These oscillations are reflected in the motor torque shown in FIG. 3B.

From 0 to 10 seconds, the torque oscillates with an amplitude of approx. 10 Nm. From 10 seconds onwards, the torque starts to oscillate with an amplitude of approx. 30 Nm.

Thus, the cyclist has tripled the pedaling effort, but in return the system offers twice as much assistance, meaning that the proportion of the cyclist's effort to the total effort required (motor+cyclist) decreases significantly compared to a situation without automatic compensation.

From 25 seconds onwards, the torque begins to oscillate with an amplitude of almost 40 Nm, while the coefficient γ reaches 3. The coefficient γ increases more significantly in relation to the variation in pedal torque than at 10 seconds. This means that the system has adapted to abruptly hardened driving conditions. In fact, the frequency of the oscillations between 25 and 30 seconds is lower than in the previous interval, reflecting a sudden slowdown of the cyclist which results in a significant contribution from the deceleration in the calculation of the modulation coefficient.

The invention claimed is:

1. A method for controlling an electric motor of a pedal-operated vehicle, the method comprising the following steps:

measuring a pedal torque applied to a crankset of the vehicle;

applying to the electric motor a control proportional to a product of the pedal torque and a variable assistance level;

determining a parameter indicative of a deviation of vehicle drag forces from nominal conditions, as a linear combination of:

a measurement of a motor torque, indicative of an instantaneous force supplied by the motor, the measured pedal torque, indicative of an instantaneous force resulting from pedaling, and a nominal drag force, function of speed and constant friction coefficients determinable for nominal riding conditions; and continuously modulating the variable assistance level as a function of the parameter indicative of the deviation of vehicle drag.

2. The method according to claim 1, wherein the linear combination also involves a differentiation of instantaneous speed measurements, indicative of a vehicle acceleration.

3. The method according to claim 2, wherein the parameter indicative of the deviation of vehicle drag is a sum of the instantaneous force supplied by the motor and the instantaneous force resulting from pedaling, from which is subtracted the nominal drag force and a force of inertia equal to a product of the vehicle acceleration and an average mass of the vehicle with its load.

4. The method according to claim 1, wherein the variable assistance level increases proportionally to the parameter indicative of the deviation of vehicle drag between two thresholds of the parameter.

5. The method according to claim 1, wherein the parameter indicative of the deviation of vehicle drag is subjected to smoothing.

* * * * *